US007682548B2

(12) United States Patent
Nishida et al.

(10) Patent No.: US 7,682,548 B2
(45) Date of Patent: Mar. 23, 2010

(54) INJECTION MOLDED ARTICLE, PRODUCTION METHOD THEREOF AND PELLETS USED FOR INJECTION MOLDED ARTICLE

(75) Inventors: Miki Nishida, Nagahama (JP); Kazuya Tanaka, Nagahama (JP); Jun Takagi, Hiratsuka (JP)

(73) Assignee: Mitsubishi Plastics, Inc., Tokyo (JP)

(*) Notice: Subject to any disclaimer, the term of this patent is extended or adjusted under 35 U.S.C. 154(b) by 963 days.

(21) Appl. No.: 10/566,818

(22) PCT Filed: Jul. 30, 2004

(86) PCT No.: PCT/JP2004/010917

§ 371 (c)(1), (2), (4) Date: Jan. 27, 2006

(87) PCT Pub. No.: WO2005/012398

PCT Pub. Date: Feb. 10, 2005

(65) Prior Publication Data

US 2006/0202391 A1 Sep. 14, 2006

(30) Foreign Application Priority Data

Jul. 30, 2003 (JP) ............................ 2003-203536

(51) Int. Cl.
*B29C 45/00* (2006.01)

(52) U.S. Cl. .............................. 264/328.18; 264/328.2

(58) Field of Classification Search ....................... None
See application file for complete search history.

(56) References Cited

U.S. PATENT DOCUMENTS 6,124,384 A * 9/2000 Shiraishi et al. ............... 524/35
7,108,820 B2 * 9/2006 Suzuki et al. ............... 264/235

FOREIGN PATENT DOCUMENTS

| | | | |
|---|---|---|---|
| JP | 09-169897 | A | 6/1997 |
| JP | 10-273582 | A | 10/1998 |
| JP | 2001-335710 | A | 12/2001 |
| JP | 2002-060502 | A | 2/2002 |
| JP | 2002-069303 | A | 3/2002 |
| JP | 2002-115173 | A | 4/2002 |
| JP | 2002-144329 | A | 5/2002 |
| JP | 2002-146219 | A | 5/2002 |
| JP | 2002-177148 | | 6/2002 |
| JP | 2003-128900 | | 5/2003 |
| JP | 2004-050482 | A | 2/2004 |
| JP | 2004-143438 | A | 5/2004 |
| WO | 00/65140 | | 11/2000 |

OTHER PUBLICATIONS

EP Search Report mailed Sep. 22, 2008 in connection with corresponding European Patent Application No. 07008665 filed Jul. 20, 2004.

PCT International Preliminary Report on Patentability for PCT/JP2004/010917, Apr. 3, 2006.

"Development of Kenaf fiber reinforced PLA" by Serizawa et al., Polymer Processing, JSPP Tech, Papers published on Jun. 2, 2003 for general session at Japan Society of Polymer Processing, Jun. 12-13, 2003, Tokyo, pp. 161-162 and English summery of the article.

* cited by examiner

*Primary Examiner*—Monica A Huson
(74) *Attorney, Agent, or Firm*—Darby & Darby P.C.

(57) ABSTRACT

To provide injection molded articles that are formed from plant-derived materials as main components and have heat resistance and high crystallization rates.

The injection molded article of the present invention includes a resin composition containing: (A) a lactic acid based resin; and (B) a natural fiber that contains 40 mass % to 60 mass % of cellulose, 10 mass % to 30 mass % of lignin, wherein the resin composition contains the lactic acid based resin (A) and the natural fiber (B) in a mass ratio of 99:1 to 70:30, and the lactic acid based resin (A) has a resin composition ratio of L-lactic acid:D-lactic acid=100:0 to 97:3, or L-lactic acid:D-lactic acid=0:100 to 3:97.

5 Claims, No Drawings

INJECTION MOLDED ARTICLE, PRODUCTION METHOD THEREOF AND PELLETS USED FOR INJECTION MOLDED ARTICLE

CROSS REFERENCE TO RELATED APPLICATION

This application is the U.S. national stage of International Application No. PCT/JP2004/10917, filed Jul. 30, 2004, which was published under PCT Article 21(2) as Publication No. WO2005/012398 and of which the instant application claims the benefit, which in turn claims the benefit of Japan Patent Application No. 2003-203536, filed Jul. 30, 2003. All these applications are incorporated herein by reference in their entirely.

TECHNICAL FIELD

The present invention relates to an injection molded article that includes a plant-derived material as a main component, crystallizes at a high rate, and has heat resistance.

BACKGROUND ART

Plastics have now widely penetrated into daily life and every field of industry; the global yearly production of plastics has reached about one hundred million tons. Most parts of the plastics are discarded after use, which has been recognized as a cause to disturb the global environment. Accordingly, materials that give no adverse effects on the global environment even after they are discarded are demanded.

Further, petroleum and the like, which are raw materials for ordinary plastics, are exhaustive resources and therefore utilization of renewable resources is demanded. For example, plastics derived from plant raw materials can be obtained from renewable and non-exhaustive resources, so that the exhaustive resources such as petroleum can be saved, and in addition, after their use, they are biodegraded and naturalized, thus having excellent recyclability.

Among the plastics derived from plant materials, lactic acid based resins can be mass-produced by chemical engineering from lactic acid obtained by fermentation of starch as a raw material and are excellent in transparence, rigidity, heat resistance and so on. Therefore, in particular, the lactic acid based resins have attracted much attention as a substitute material for polystyrene and polyethylene terephthalate in the fields of injection molded articles such as film packaging materials, white goods, OA appliances, and automobile parts.

Injection molded articles for use in white goods, OA appliances, automobile parts and so on must have heat resistance to prevent fire. However, the lactic acid based resins have low glass transition temperatures and have poorer heat resistance than ABS resins, filler-contained polypropylene resins and the like. Therefore, the conventional lactic acid based resins have been difficult to use for white goods, OA appliances, and automobile parts.

Composite materials composed of a biodegradable resin and a natural fiber to improve the heat resistance of biodegradable resins is known. For example, Japanese Patent Application Laid-open Publication No. H09-169897 discloses a biodegradable fiber-reinforced molded article in which, for example, a natural fiber is bound to an aliphatic polyester resin in a dispersed state. Japanese Patent Application Laid-open Publication No. 2002-146219 discloses production of a biodegradable composite material by mixing a natural fiber and fine particulate biodegradable resin and hot press molding the resultant mixture.

However, these composite materials have insufficient heat resistance and may sometime cause a problem in their practical use.

Patent Document 1: Japanese Patent Application Laid-open Publication No. H09-169897

Patent Document 2: Japanese Patent Application Laid-open Publication No. 2002-146219

DISCLOSURE OF THE INVENTION

Problem to be Solved by the Invention

The present invention has been made with a view to solving the above-mentioned problems and it is an object of the present invention to provide an injection molded article that includes a plant-derived material as a main component, has excellent heat resistance, and crystallizes at a high rate.

Means for Solving the Problem

Under the circumstances, the inventors of the present invention have made extensive studies and as a result, the present invention that is highly effective has been accomplished.

The injection molded article of the present invention includes a resin composition containing (A) a lactic acid based resin, and (B) a natural fiber that contains 40 mass % to 60 mass % of cellulose, 10 mass % to 30 mass % of lignin, in which the resin composition contains the lactic acid based resin (A) and the natural fiber (B) in a mass ratio of 99:1 to 70:30, and the lactic acid based resin (A) has a resin composition ratio of L-lactic acid:D-lactic acid=100:0 to 97:3, or L-lactic acid:D-lactic acid=0:100 to 3:97.

Here, it is preferable that the resin composition has a crystallization heat peak temperature (Tc) of 100° C. or more.

Further, the injection molded article can have a deflection temperature under load of 133° C. or more.

The injection molded article of the present invention can be formed after kneading a coated substance, which is obtained by impregnating (dipping) the natural fiber (B) with (in) the lactic acid based resin (A), with the lactic acid based resin (A).

Alternatively, the injection molded article of the present invention may be formed after kneading a coated substance, which is obtained by impregnating (dipping) the natural fiber (B) with (in) the lactic acid based resin (A) by draw molding, with the lactic acid resin (A).

The pellets of the present invention include a resin composition containing (A) a lactic acid based resin, and (B) a natural fiber that contains 40 mass % to 60 mass % of cellulose, 10 mass % to 30 mass % of lignin, in which the resin composition contains the lactic acid based resin (A) and the natural fiber (B) in a mass ratio of 99:1 to 70:30, and the lactic acid based resin (A) has a resin composition ratio of L-lactic acid:D-lactic acid=100:0 to 97:3, or L-lactic acid:D-lactic acid=0:100 to 3:97.

Here, the pellets can have an appearance that constituent components thereof are uniformly dispersed.

The pellets of the present invention can be formed by kneading a coated substance, which is obtained by impregnating (dipping) the natural fiber (B) with (in) the lactic acid based resin (A), with the lactic acid based resin (A).

The method of producing pellets of the present invention includes the steps of: impregnating (dipping) the natural fiber (B) with (in) the lactic acid based resin (A); and adding the lactic acid based resin (A) to the resultant of the impregnating (dipping) step and kneading the resultant mixture.

Another method of producing pellets of the present invention includes the steps of: impregnating (dipping) the natural fiber (B) with (in) the lactic acid based resin by drawing to form coated pellets; and adding the lactic acid based resin (A) to the coated pellets and kneading the resultant mixture.

The method of producing an injection molded article according to the present invention includes the steps of: impregnating (dipping) the natural fiber (B) with (in) the lactic acid based resin by drawing to form coated pellets; adding the lactic acid based resin (A) to the coated pellets and kneading the resultant mixture; and forming an injection molded article from the kneaded pellets.

According to the present invention, an injection molded article that includes a plant-derived material as a main component, has excellent heat resistance, and crystallizes at a high rate can be obtained by using a resin composition that contains a lactic acid based resin and other components and is blended with a natural fiber that contains a predetermined amount of lignin.

BEST MODE FOR CARRYING OUT THE INVENTION

Hereinafter, the present invention is explained.

The injection molded article of the present invention includes a resin composition containing (A) a lactic acid based resin, and (B) a natural fiber that contains 40 mass % to 60 mass % of cellulose, 10 mass % to 30 mass % of lignin. In this case, the resin composition must contain the lactic acid based resin (A) and the natural fiber (B) in a mass ratio of 99:1 to 70:30, and preferably 95:5 to 80:20. If the content of the natural fiber (B) is lower than 1 mass %, the effect of improving the heat resistance and crystallization rate is poor while if the content of the natural fiber (B) is higher than 30 mass %, the resultant injection molded article has a decreased impact strength and therefore causes a problem in practical use.

Examples of the natural fiber (B) that contains 40 mass % to 60 mass % of cellulose, 10 mass % to 30 mass % of lignin include natural fibers such as kenaf, bamboo, and bagasse that contain 40 mass % to 60 mass % of cellulose, 10 mass % to 30 mass % of lignin. The blended natural fiber containing cellulose and lignin in this manner can bring about a crystallization promoting effect and excellent heat resistance as a result of synergism between the increase in modulus of elasticity due to crystallization and the reinforcement with fibers. When less than 40 mass % of cellulose or less than 10 mass % of lignin is used, crystallization is not promoted and practically satisfactory heat resistance cannot be obtained although the effect of improvement of heat resistance as a result of reinforcement with the fiber can be expected. On the other hand, when more than 60 mass % of cellulose is used, the fiber undergoes thermal deterioration to cause discoloration or a decrease in strength while with more than 30 mass % of lignin, appearance failure occurs due to bleeding of low molecular weight: substances or the like.

The lactic acid based resins (A) used in the present invention include poly(L-lactic acid) whose structural unit is L-lactic acid, poly(D-lactic acid) whose structural unit is D-lactic acid, poly(DL-lactic acid) whose structural units are L-lactic acid and D-lactic acid, and mixtures thereof. Here, the compositional ratio of D-lactic acid (D-form) and L-lactic acid (L-form) of a lactic acid based resin is L-form:D-form=100:0 to 97:3, or L-form:D-form=0:100 to 3:97. Outside the above-mentioned range of the compositional ratio of the L-form to the D-form, it is difficult for the molded articles to exhibit heat resistance and thus the molded articles can be used in only limited applications. In consideration of availability and other factors, it is preferable that the compositional ratio of the L-form to the D-form be L-form:D-form=99.5:0.5 to 97:3, or L-form:D-form=0.5:99.5. to 3:97.

Polymerization methods that can be used for polymerizing lactic acid based resins include known methods such as a polycondensation method and a ring opening polymerization method. For example, in the polycondensation method, L-lactic acid, D-lactic acid, or mixtures of these can be directly subjected to dehydropolycondensation to obtain lactic acid based resins having any desired compositions.

Moreover, in the ring opening polymerization method, from a lactide, which is cyclic dimers of lactic acid, a ractic acid based resin can be obtained by selecting an appropriate catalyst and optionally using a modifier. The lactide include L-lactide, which is a dimer of L-lactic acid, D-lactide, which is a dimer of D-lactide, and DL-lactide, which is a dimer consisting of L-lactic acid and D-lactic acid. This lactide can be polymerized optionally after mixing as necessary to obtain lactic acid based resins having any desired compositions and any desired crystallinities.

Further, where necessary, for example, to improve the heat resistance of the resultant lactic acid based resin, a small amount of a copolymerizable component can be added to the composition to be polymerized. Examples of the small amount copolymerizable component that can be used include non-aliphatic dicarboxylic acids such as terephthalic acid and/or non-aliphatic diols such as ethylene oxide adducts of bisphenol A.

Furthermore, with a view to increasing the molecular weight of the resultant lactic acid based resin, a small amount of a chain extender, for example, a diisocyanate compound, an epoxy compound, and an acid anhydride can be used.

The lactic acid based resins may be copolymers of any one of the lactic acids and/or with another hydroxycarboxylic acid unit, such as α-hydroxycarboxylic acid other than the lactic acids or with an aliphatic diol and/or an aliphatic dicarboxylic acid.

Examples of the other hydroxycarboxylic acid unit include difunctional aliphatic hydroxycarboxylic acids such as optical isomers of lactic acid (D-lactic acid for L-lactic acid, or L-lactic acid for D-lactic acid), glycolic acid, 3-hydroxybutyric acid, 4-hydroxybutyric acid, 2-hydroxy-n-butyric acid, 2-hydroxy-3,3-dimethylbutyric acid, 2-hydroxy-3-methylbutyric acid, and 2-hydroxycapric acid; and lactones such as caprolactone, butyrolactone, and valerolactone.

The aliphatic diols that are copolymerized with the lactic acid based resins include, for example, ethylene glycol, 1,4-butanediol, and 1,4-cyclohexanedimethanol. The aliphatic dicarboxylic acids include, for example, succinic acid, adipic acid, suberic acid, sebacic acid, and dodecanedioic acid.

The copolymers may have any structure and include, for example, a random copolymer, a block copolymer, and graft copolymer. In particular, from the viewpoints of the effect of improving their impact strength and of the transparence thereof, block copolymers are preferable. Assuming that a polylactic acid segment is named A, and, for example, a diol dicarboxylic acid segment is named B, formation of typically an ABA block copolymer can give rise to a polymer having both transparence and impact strength. In this case, it is preferable that the glass transition temperature (Tg) of the segment B be 0° C. or less in order for the resin to exhibit impact strength.

The lactic acid-based resin has a weight average molecular weight within the range of, preferably 50,000 to 400,000, more preferably 100,000 to 250,000. When the lactic acid-based resin has a weight average molecular weight of below 50,000, it shows substantially no practically useful physical properties such as mechanical properties, heat resistance and so like while the resin has a weight average molecular weight of above 400,000, it sometimes has too high a melt viscosity to be suitably molded.

Typical examples of the lactic acid based resins that can be preferably used in the present invention include among others "NATURE WORKS" series resins manufactured by Cargill Dow as commercially available resins.

In the present invention, an aliphatic polyester and/or an aromatic aliphatic polyester, having a glass transition temperature (Tg) of 0° C. or less can be mixed with the lactic acid based resin. Preferably, the mixing amount of these polyesters is within the range of 5 to 50 parts by mass per 100 parts by mass of the lactate base resin. As stated above, when mixed with the aliphatic polyester and the like having a glass transition temperature (Tg) of 0° C. or less, the lactic acid based resin can have impact strength. When the aliphatic polyester has a glass transition temperature (Tg) of above 0° C., the effect of improving the impact strength of the lactic acid based resin becomes poor.

Examples of the aliphatic polyester having a glass transition temperature (Tg) of 0° C. or less that can be used in the present invention include aliphatic polyesters other than the lactate resin, for example, aliphatic polyesters obtained by condensing aliphatic diols with aliphatic dicarboxylic acids, and aliphatic polyesters obtained by ring-opening polymerization of cyclic lactones.

The above-mentioned "aliphatic polyesters obtained by condensing aliphatic diols with aliphatic dicarboxylic acids" include those obtained by condensing at least one aliphatic diol with at least one aliphatic dicarboxylic acid each selected from the aliphatic diols and aliphatic dicarboxylic acids set forth below. Jump up of the aliphatic polyesters with isocyanates, epoxy compounds, etc. as necessary can give rise to desired polymers (high molecular weight polymers). In the present invention, it is preferable that such aliphatic polyesters are biodegradable. Typical examples of the aliphatic diols used herein include ethylene glycol, propylene glycol, 1,4-butanediol, and 1,4-cyclohexanedimethanol. Typical examples of the aliphatic dicarboxylic acid include succinic acid, adipic acid, suberic acid, sebacic acid, and dodecanedioic acid.

The above-mentioned "aliphatic polyesters obtained by ring-opening polymerization of cyclic lactones" include those obtained by polymerization of at least one cyclic monomer such as ϵ-caprolactone, δ-valerolactone, and β-methyl-δ-valerolactone.

The aromatic aliphatic polyesters that can be used in the present invention include those obtained by introducing aromatic rings between the aliphatic chains of aliphatic polyester to decrease the crystallinity of the polymer. The aromatic aliphatic polyesters can be obtained, for example, by condensing an aromatic dicarboxylic acid component, an aliphatic dicarboxylic acid component, and an aliphatic diol component.

Examples of the aromatic dicarboxylic component include terephthalic acid, isophthalic acid, and naphthalenedicarboxylic acid. Examples of the aliphatic dicarboxylic acid component include succinic acid, adipic acid, suberic acid, sebacic acid, and dodecanedioic acid. The aliphatic diol components include, for example, ethylene glycol, 1,4-butanediol, and 1,4-cyclohexanedimethanol. Two or more each of the aromatic dicarboxylic component, the aliphatic dicarboxylic acid component, and the aliphatic diol component can be used.

In the present invention, the aromatic dicarboxylic acid component that is most suitably used is terephthalic acid; the aliphatic dicarboxylic acid component that is most suitably used is adipic acid; and the aliphatic diol component that is most suitably used is 1,4-butanediol.

The aliphatic polyesters other than the above-mentioned lactic acid based resins include copolymers of succinic acid, 1,4-butanediol, and adipic acid; and the aromatic-aliphatic polyesters include copolymers of tetramethylene adipate and terephthalate, and copolymers of polybutylene adipate and terephthalate. Specific examples of the aliphatic polyesters other than the lactic acid based resins and of the aromatic-aliphatic polyesters that are commercially available include "BIONOLE" series resins manufactured by Showa High-polymer Co., Ltd. obtained by polymerization of succinic acid, 1,4-butanediol, and adipic acid; "CELL GREEN" series resins manufactured by Daicel Chemical Industry and "ENPOLE" series resins manufactured by Ire Chemical, both being obtained by ring opening condensation of ϵ-caprolactone; "EASTAR BIO" manufactured by Eastman Chemical obtained as a copolymer of tetramethylene adipate and terephphalate; "ECOFLEX F" manufactured by BASF as a copolymer of polybutylene adipate and terephthalate As stated above, the resin compositions used for forming the injection molded articles of the present invention may include copolymers of lactic acid based resins and copolymers of diols and dicarboxylic acids. Alternatively, such resin compositions may include the aliphatic polyesters other than the lactic acid based resins and/or the aromatic aliphatic polyesters.

In the present invention, the lactic acid based resin (A) and the natural fiber (B) must be mixed in proportions within the range of 99:1 to 70:3 by mass ratio. The lactic acid based resins may include the above-mentioned copolymers, the aliphatic polyesters, and/or the aromatic-aliphatic polyesters. That is, when aliphatic polyesters having a glass transition temperature of 0° C. or less, and/or aromatic-aliphatic polyesters are to be mixed, the mass of the lactic acid based resin is defined as the sum of the mass of the lactic acid based resin and the mass of each of the above-mentioned additional components and hence this total mass of all the components must be within the mixing amount of the lactic acid based resin (A).

In the present invention, it is preferable that the coated substance obtained by impregnating the natural fiber with the lactic acid based resin by drawing (pultruding) be further mixed with the lactic acid based resin and kneaded before the coated substance is subjected to injection molding. Here, preferably, the coated substance obtained by impregnating the natural fiber with the lactic acid based resin is pelletized to form coated pellets in advance. Here, it is also preferable that the coated substance pellets be kneaded with the lactic acid based resin and pelletized to form pellets in advance. In the pellets, the constituents appear to be dispersed uniformly with the unassisted eye. The kneading an be performed by using a unidirectional twin-screw extruder.

Incidentally, when stored for a long period of time, injection molded articles could cause hydrolysis due to steam in air or moisture from outside, which could lead to a decrease in the mechanical strength thereof.

In the present invention, to increase the durability of the injection molded articles, the injection molded articles may further contain (C) a hydrolysis preventing agent. Here, the blending amount of the hydrolysis preventing agent (C) is preferably 0.1 to 5.0 parts by mass per 100 parts by mass of the total mass of the lactic acid based resin (A) and the natural fiber (B). When the amount of the hydrolysis preventing agent (C) to be added is 0.1 parts by mass or more and 5.0 parts by mass or less, the injection molded articles can be imparted with sufficient durability without deteriorating the biodegradability thereof, or without bleeding of the hydrolysis preventing agent, thus causing neither appearance failure nor decrease in mechanical properties due to plasticization.

The hydrolysis preventing agent that can be used in the present invention include, for example, epoxy compounds, isocyanate compounds, acid anhydrides, oxazoline compounds, and melamine compounds. Among these, carbodiimide compounds are preferably used.

Particularly preferable carbodiimide compounds that can be used in the present invention have a structural unit represented by the following general formula:

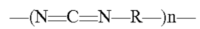

wherein R represents an organic bonding unit, which can be, for example, aliphatic, alicyclic or aromatic; n is an integer of 1 or more which is usually selected appropriately from the range between 1 and 50. When n is 2 or more, two or more R's may be the same or different.

Specific examples of the carbodiimide compound include bis(dipropylphenyl) carbodiimide, poly(4,4'-diphenylmethane carbodiimide), poly(p-phenylene carbodiimide), poly(m-phenylene carbodiimide), poly(tolylcarbodiimide), poly(diisopropylphenylene carbodiimide), poly(methyl-diisopropylephenylene carbodiimide), and poly(triisopropylphenylene carbodiimide) as well as monomers of thereof. The carbodiimide compounds may be used alone or as combinations of two or more of them.

The carbodiimide compounds used in the present invention are preferably aromatic carbodiimide compounds. Although aliphatic carbodiimide compounds have sufficient anti-hydrolysis properties imparting effects, the aromatic carbodiimide compounds can impart anti-hydrolysis properties more effectively than the aliphatic carbodiimide compounds.

Specific examples of the carbodiimide compound include "STABAKZOL" manufactured by Rhein Chemie, and "CARBODILITE" manufactured by Nisshinbo Industries, Inc.

In the present invention, additives such as heat stabilizers, nucleating agents, antioxidants, UV absorbents, light stabilizers, lubricants, pigments, dyes and plasticizers can be added to the resin composition used for forming the injection molded articles as far as the effects given by the present invention are not deteriorated.

In the present invention, by the term "the crystallization heat peak temperature (Tc)" is meant a temperature measured by differential scanning calorimetry at which a peak of crystallization comes into existence in a process of temperature drop of a sample when the sample is kept at 200° C. for 2 minutes and then the temperature is dropped to 40° C. under the condition of 10° C./min. In the present invention, the crystallization heat peak temperature (Tc) of the resin composition for forming injection molded articles is preferably 100° C. or more, more preferably 110° C. or more. When the crystallization heat peak temperature is 100° C. or more, the crystallization speed is high, so that the crystallization proceeds in a short time in the mold when injection molding the resin composition. Also, when the crystallization is performed after the resin composition is taken out from the mold after molding, the crystallization proceeds in a short time, so that injection molded articles can be obtained efficiently.

In the present invention, the injection molded article preferably has a deflection temperature under load of 133° C. or more, and more preferably 140° C. or more. When the injection molded article has a deflection temperature under load of 133° C. or more, it can be advantageously used for daily commodities and food containers and soon of which heat resistance is desired while when the injection molded article has a deflection temperature under load of 140° C. or more, it can be advantageously used for electric and electronic parts and automobile parts and so on.

The injection molded articles of the present invention preferably have a flexural modulus at 80° C. of 800 MPa or more, more preferably 860 MPa or more. By blending the lactic acid based resin (A) with the component (B), i.e., the natural fiber that contains 40 mass % to 60 mass % of cellulose, 10 mass % to 30 mass % of lignin in appropriate amounts, the flexural modulus of the injection molded articles can be increased, so that they can be used for applications of which heat resistance is required.

Now, the method of forming the injection molded articles according to the present invention is explained.

The injection molded articles of the present invention can be formed by a method that includes forming pellets of a coated substance from the coated substance obtained by impregnating a natural fiber with a lactic acid based resin by drawing; extruding the pellets of the coated substance, the lactic acid based resin, and optionally one or more other additives using a twin-screw extruder into strands to prepare pellets in advance; charging the prepared pellets in an injection molding machine and performing injection molding. Alternatively, the injection molded articles of the present invention can be formed by another method that includes charging the lactic acid based resin and the natural fiber and optional additives in a twin-screw extruder, directly kneading the mixture and injection molding the kneaded mixture. In the present invention, the former method, that is, the method in which after the pellets of the coated substance are formed by drawing, the obtained pellets are kneaded with the lactic acid based resin is preferable. By impregnating the natural fiber with the lactic acid based resin by drawing, the feed failure due to the high bulk density of the fiber is alleviated and when the impregnated natural fiber is kneaded in the twin-screw extruder, the dispersibility of the natural fiber is further increased, so that the effect of improving heat resistance and crystallization rate of the injection molded article can be exhibited maximally. Since the lactic acid based resin is susceptible to hydrolysis when melt molding, it is preferable that the lactic acid based resin be dried or passed through a vacuum vent extrusion process in advance.

The injection molding method that can be used in the present invention include, for example, various injection molding methods, such as a method that is generally adopted when thermoplastic resins are molded, a gas-assisted molding method, an injection compression molding method and so on. In addition, depending on the purposes, molding methods other than those described above can be used. For example, an in-mold molding method, a gas-press molding method, two-color molding methods, sandwich molding methods, PUSH-PULL, and SCORIM, can be adopted. However, the injection molding method that can be used in the present invention is not limited thereto.

The injection molding apparatus includes a generally used injection molding machine, a gas-assisted molding machine, an injection compression molding machine or the like and a mold used for the injection molding machine and accessory devices, a mold temperature controlling apparatus, a material drying apparatus and so on. Preferably, molding conditions are set so as to avoid thermal degradation of the resin in the injection cylinder such that molding is performed at a molten resin temperature within the range of 170° C. to 210° C.

In the case where the injection molded articles are to be obtained in an amorphous state, the temperature of the mold is preferably as low as possible in order to shorten a cooling time in the molding cycle (mold closure-injection-pressure maintenance-cooling-mold opening-taking out). It is preferable that the temperature of the mold be set generally 15° C. to 55° C. It is also desirable to use a chiller. However, to suppress, for example, shrinkage, curl, and deformation of the molded product after post-crystallization, it is preferable to set the temperature of the mold to a higher-temperature side in the range of 15° C. to 55° C.

The molded articles obtained by injection molding may be heat-treated to crystallize them. By crystallizing the molded articles in this manner, the heat resistance of the molded articles can be further increased. The crystallization treatment can be performed in the mold at the time of molding, and/or after taking out the molded articles from the mold. From the viewpoint of the productivity, it is preferable to perform the crystallization treatment after the molded article is taken out from the mold when the crystallization rate of the resin composition that constitutes the injection molded article is low. On the other hand, when the crystallization rate of the resin composition is high, the crystallization treatment may be performed while the injection molded article is in the mold. In the case where the crystallization is allowed to occur in the mold, molten resin is filled in a heated mold and kept in the mold for a predetermined time. The temperature of the mold is in the range of, preferably 80° C. to 130° C., more preferably 90° C. to 120° C. The cooling time in which the injection molded article is cooled is preferably 1 to 300 seconds, more preferably 5 to 30 seconds. When the injection molded article is subjected to crystallization treatment within the above-mentioned temperature range and cooling time, the injection molded article can have a further improved heat resistance.

When the crystallization is allowed to proceed after the molded article is taken out from the mold, the mold temperature is preferably 60° C. to 130° C., more preferably 70° C. to 90° C. When the mold temperature is lower than 60° C., in some cases no crystallization proceeds in the molding step. On the other hand, when the mold temperature is higher than 130° C., deformation or shrinkage may occur when the molded product is cooled. The heating time can be determined appropriately depending on the composition of the resin that constitutes the injection molded article and the temperature of heat treatment. For example, when the temperature of the heat treatment is 70° C., it is preferable to perform the heat treatment for 15 minutes to 5 hours. On the other hand, when the temperature of the heat treatment is 130° C., it is preferable to perform the heat treatment for 10 seconds to 30 minutes.

Methods by which the molded product is crystallized include a method that includes performing injection molding using a mold that is heated to a predetermined temperature and causing crystallization the resultant as it is in the mold, a method that includes and increasing the temperature of the mold after the injection molding to cause crystallization in the mold, a method that includes crystallization by using hot air, steam, warm water, a far infrared ray heater, an IH heater or the like after taking the injection molded article out of the mold, and so on. At the time of heat treatment, the injection molded article does not have to be fixed. However, to prevent deformation of the molded product, it is preferable to fix the molded product by using a metal mold or a resin mold. Also, taking productivity into consideration, it is preferable that the molded products be heat-treated in a wrapped state.

Since the injection molded articles of the present invention has excellent heat resistance and excellent crystallization rate, they can be advantageously used as electric and electronic parts, automobile parts, daily commodities, food containers and other general injection molded articles of which heat resistance is required.

Hereinafter, the present invention is described in more detail by referring to examples. However, the present invention should not be considered to be limited thereto and various modifications and variations can be made within the technical scope of the present invention. In the examples and comparative examples, various properties were evaluated by the following methods.

(1) Deflection Temperature Under Load (Heat Resistance)

A sample with a length (L) of 120 mm, a width (W) of 11 mm, and a thickness (t) of 3 mm was prepared according to JIS K-7191 and measured for deflection temperature under load (HDT) using a deflection temperature under load tester ("S-3M" manufactured by Toyo Seiki Co., Ltd.). The measurements were performed under the conditions of flat-wise direction and under bending stress of 45.1 $N/cm^2$.

(2) Flexural Modulus (Rigidity)

A sample with a length (L) of 80 mm, a width (W) of 10 mm, and a thickness (t) of 4 mm was prepared according to JIS K-7171 and measured for flexural modulus at 80° C. using a precision universal material testing machine "MODEL 2010" manufactured by Intesco Co., Ltd.

(3) Crystallization Heat Peak Temperature

About 10 mg of scales were scraped out of each injection molded article to obtain samples. Each sample was measured for temperature drop according to JISK-7121 using a differential scanning calorimeter "DSC-7" manufactured by Perkin-Elmer. Each injection molded article sample was heated at 200° C. for 2 minutes to melt it. Thereafter, the temperature was dropped under the condition of 10° C./min and measurement was performed. The temperature at which crystallization peak was observed in this temperature drop process was defined to be a crystallization heat peak temperature.

EXAMPLE 1

"Nature Works 4032D" (L-lactic acid/D-lactic acid=99/1, having a weight average molecular weight of 200,000) manufactured by Cargill Dow as a lactate resin, and kenaf fiber (having a cellulose content of 53 mass % and a lignin content of 18 mass %, and an average diameter of 17 mm) manufactured by OG Corporation as a natural fiber were used. The lactic acid based resin was supplied to a 30 mm-ϕ single screw extruder manufactured by Silico-Pla Co. coupled with a crosshead die for drawing. On the other hand, the kenaf fiber was passed through holes in the crosshead die to impregnate the kenaf fiber with the lactic acid based resin at a resin temperature of 180° C., and then the impregnated fiber was cooled in a water tank. Then, the coated fiber was passed through a cutter to fabricate pellets of the coated substance. The obtained pellets of the coated substance have an average diameter of 1.5 mm and an average length of 3 mm. The ratio of the kenaf fiber to the lactic acid based resin in the pellets of the coated substance was (A) lactic acid based resin: (B) kenaf fiber=70:30 (mass %).

Then, the obtained pellets of the coated substance and the lactic acid based resin (Nature Works 4032D) were blended so that the ratio of the lactic acid based resin and the kenaf fiber was (A) lactic acid based resin:(B) kenaf fiber=95:5 by mass ratio, and compounded at 180° C. using a 25 mm-ϕ small unidirectional twin-screw extruder manufactured by Mitsubishi Heavy Industry Co., Ltd. to form pellets. The obtained pellets were injection molded using an injection molding machine "IS50E" (having a screw diameter of 25 mm) manufactured by Toshiba Machine Co., Ltd. to obtain plates. A plate of L 100 mm×W 100 mm×t 3 mm, a plate of L 120 mm×W 11 mm×t 3 mm, a plate of L 100 mm×W 100 mm×t 4 mm, and a plate of L 80 mm×W 10 mm×t 4 mm were fabricated. Major molding conditions were as follows.

1) Temperature conditions: Cylinder temperature (195° C.), Mold temperature (20° C.);
2) Injection molding conditions: Injection pressure (115 MPa) Holding pressure (55 MPa);
3) Metering conditions: Number of screw rotations (65 rpm), Back-pressure (15 MPa).

The obtained injection molded articles (plates) were left to stand in a baking test apparatus (DKS-5S) manufactured by Daiei Kagaku Seiki Mfg. Co., Ltd. and heat-treated at 70° C. for 3.5 hours to promote crystallization. The obtained injection molded articles (plates) were measured (evaluated) for deflection temperature under load, flexural modulus (bending strength), and crystallization heat peak temperature. Over-all judgment was made based on the evaluations. Note that the symbol "◎" means particularly excellent; symbol "○" means that all the evaluation items were satisfied in good balance and excellent; symbol "x" means poor and application to injection molded articles of which sufficient heat resistance, rigidity and so on are required was impossible. The results obtained are shown in Table 1.

EXAMPLE 2

Injection molded articles (plates) were fabricated in the same manner as that in Example 1 except that the content ratio of the lactic acid based resin (A):the natural fiber (B) was changed to Nature Works 4032D:kenaf fiber=90:10 (mass %).

The obtained injection molded articles (plates) were evaluated (measured) in the same manner as in that in Example 1. The results obtained are shown in Table 1.

EXAMPLE 3

Injection molded articles (plates) were fabricated in the same manner as that in Example 1 except that the content ratio of the lactic acid based resin (A):the natural fiber (B) was changed to Nature Works 4032D:kenaf fiber=80:20 (mass %).

The obtained injection molded articles (plates) were evaluated (measured) in the same manner as in that in Example 1. The results obtained are shown in Table 1.

EXAMPLE 4

Injection molded articles (plates) were fabricated in the same manner as that in Example 1 except that the natural fiber was changed to bamboo fiber (having a cellulose content of 53% and a lignin content of 27%, and an average diameter of 10 mm), and the content ratio of the lactic acid based resin (A):the natural fiber (B) was changed to Nature Works 4032D:bamboo fiber=90:10 (mass %).

The obtained injection molded articles (plates) were evaluated (measured) in the same manner as in that in Example 1. The results obtained are shown in Table 1.

EXAMPLE 5

Injection molded articles (plates) were fabricated in the same manner as that in Example 1 except that Nature Works 5040D (L-lactic acid/D-lactic acid=97.7/2.3, having a weight average molecular weight of 200,000) was used in place of Nature Works 4032D.

The obtained injection molded articles (plates) were evaluated (measured) in the same manner as in that in Example 1. The results obtained are shown in Table 1.

COMPARATIVE EXAMPLE 1

Injection molded articles (plates) were fabricated in the same manner as that in Example 1 except that no natural fiber (B) was used but only Nature Works 4032D as the lactic acid based resin was used.

The obtained injection molded articles (plates) were evaluated (measured) in the same manner as in that in Example 1. The results obtained are shown in Table 1.

COMPARATIVE EXAMPLE 2

Injection molded articles (plates) were fabricated in the same manner as that in Example 1 except that glass fiber (having an average thickness of 5 mm and an average length of 2 mm) manufactured by Asahi Glass Company was used in place of the natural fiber, and the content ratio of the lactic acid based resin and the glass fiber was changed to Nature Works 4032D: glass fiber=90:10 (mass %).

The obtained injection molded articles (plates) were evaluated (measured) in the same manner as in that in Example 1. The results obtained are shown in Table 1.

COMPARATIVE EXAMPLE 3

Injection molded articles (plates) were fabricated in the same manner as that in Example 1 except that flax fiber (having a cellulose content of 80 mass % and a lignin content of 1 mass %, and an average diameter of 20 mm) manufactured by Teikoku Sen-I Co., Ltd. was used in place of the natural fiber, and the content ratio of the lactic acid based resin and the flax fiber was changed to Nature Works 4032D: flax fiber=90:10 (mass %).

The obtained injection molded articles (plates) were evaluated (measured) in the same manner as in that in Example 1. The results obtained are shown in Table 1.

COMPARATIVE EXAMPLE 4

Injection molded articles (plates) were fabricated in the same manner as that in Example 1 except that the kenaf fiber used in Example 1 was heat refluxed with a mixed solution of sodium chlorite, glacial acetic acid, and distilled water at 70 to 80° C. (having a lignin content of 8.5 mass %) was used in place of the natural fiber. That is, injection molded articles (plates) were fabricated in the same manner as that in Example 1 except that the natural fiber was changed to a natural fiber having a cellulose content of 58 mass % and a lignin content of 8.5 mass %) and the content ratio of the lactic acid based resin and the natural fiber was changed to Nature Works 4032D:natural fiber=90:10 (mass %).

The obtained injection molded articles (plates) were evaluated (measured) in the same manner as in that in Example 1. The results obtained are shown in Table 1.

COMPARATIVE EXAMPLE 5

Injection molded articles (plates) were fabricated in the same manner as that in Example 1 except that in Example 1, Nature Works 4050D (L-lactic acid/D-lactic acid=95.0/5.0, having a weight average molecular weight of 180,000) was used in place of Nature Works 4032D.

The obtained injection molded articles (plates) were evaluated (measured) in the same manner as in that in Example 1. The results obtained are shown in Table 1.

TABLE 1

| | | Example | | | | | Comparative Example | | | | |
|---|---|---|---|---|---|---|---|---|---|---|---|
| | | 1 | 2 | 3 | 4 | 5 | 1 | 2 | 3 | 4 | 5 |
| Amount | (A) Lactate based resin | 95 | 90 | 80 | 90 | 95 | 100 | 90 | 90 | 90 | |
| | Lactate based resin (L/D = 95/5) | | | | | | | | | | 95 |
| | (B) Kenaf | 5 | 10 | 20 | | 5 | | | | | 5 |
| | (B) Bamboo | | | | 10 | | | | | | |
| | Natural fiber (lignin 8.5 mass %) | | | | | | | | | 10 | |
| | Glass fiber | | | | | | | 10 | | | |
| | Flax (lignin 1 mass %) | | | | | | | | 10 | | |
| Deflection temperature under load (° C.) | | 139 | 142 | 151 | 140 | 136 | 117 | 125 | 132 | 123 | 120 |
| Flexural modulus (MPa) | | 850 | 900 | 1200 | 860 | 840 | 500 | 550 | 650 | 640 | 520 |
| Crystallization heat peak temperature (° C.) | | 114 | 112 | 109 | 110 | 112 | 96 | 94 | 94 | 94 | 94 |
| Over-all judgment | | ○ | ◎ | ○ | ◎ | ○ | X | X | X | X | X |

The results shown in Table 1 indicate that the injection molded articles of Examples 1 to 5 have deflection temperatures under load of 133° C. or more so that they have excellent heat resistances, and high flexural moduli at 80° C. so that they have excellent rigidity. Further, the injection molded articles of Examples 1 to 5 (resin compositions) have a crystallization heat peak temperatures of 100° C. or more so that they have high crystallization rates.

On the other hand, it revealed that the injection molded articles of Comparative Examples 1 to 5 had deflection temperatures under load of 132° C. or less, low flexural moduli and crystallization heat peak temperatures of 96° C. or less.

That is, By blending a natural fiber having a cellulose content of 40 to 60 mass % and a lignin content of 10 to 30 mass % to a predetermined lactic acid based resin, excellent crystallization promoting effects and improvement of heat resistance due to synergism between the promotion of crystallization and reinforcement with the fiber could be simultaneously achieved.

The invention claimed is:

1. A method for producing injection molded article, comprising the steps of:

forming pellets of a coated substance after impregnating a natural fiber (B) in a lactic acid based resin (A) by drawing;

adding a further portion of the lactic acid based resin (A) to the pellets of the coated substance and kneading the resultant mixture to form pellets; and forming an injection molded article from the pellets obtained after the kneading.

2. The method according to claim 1, wherein the natural fiber (B) contains 40 mass % to 60 mass % of cellulose and 10 mass % to 30 mass % of lignin.

3. The method according to claim 2, wherein the resultant mixture comprises lactic acid based resin (A) and natural fiber (B) in a mass ratio of 99:1 to 70:30.

4. The method according to claim 3, wherein the lactic acid based resin (A) has either one of a resin composition ratio of L-lactic acid:D-lactic acid=100:0 to 97:3 or L-lactic acid:D-lactic acid=0:100 to 3:97.

5. The method according to claim 4, wherein the resin composition has a crystallization heat peak temperature (Tc) of 100° C. or more.

* * * * *